(12) United States Patent
Reed et al.

(10) Patent No.: US 12,453,311 B2
(45) Date of Patent: Oct. 28, 2025

(54) ELECTRIC ROW UNIT DRIVE SYSTEM FOR CORN HEADER OF COMBINE HARVESTER

(71) Applicant: CNH Industrial America LLC, New Holland, PA (US)

(72) Inventors: Daniel Reed, Brownstown, PA (US); Eric Walker, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 740 days.

(21) Appl. No.: 17/832,818

(22) Filed: Jun. 6, 2022

(65) Prior Publication Data

US 2023/0389473 A1 Dec. 7, 2023

(51) Int. Cl.
A01D 45/02 (2006.01)
A01D 41/127 (2006.01)
A01D 69/02 (2006.01)

(52) U.S. Cl.
CPC ........... *A01D 45/021* (2013.01); *A01D 69/02* (2013.01); *A01D 41/127* (2013.01)

(58) Field of Classification Search
CPC .... A01D 43/08–43/088; A01D 45/02–45/028; A01D 69/02; A01D 61/02; A01D 61/04
See application file for complete search history.

(56) References Cited

U.S. PATENT DOCUMENTS

| | | | |
|---|---|---|---|
| 4,539,799 A * | 9/1985 | Kalverkamp | ........ A01D 45/021 56/106 |
| 8,028,506 B1 | 10/2011 | Casper et al. | |
| 8,413,413 B2 | 4/2013 | Lohrentz et al. | |
| 8,534,036 B2 | 9/2013 | Zegota et al. | |
| 9,578,804 B2 * | 2/2017 | Gessel | .................. A01D 45/021 |
| 10,130,038 B2 | 11/2018 | Bernklau et al. | |
| 10,188,037 B2 * | 1/2019 | Bruns | ................ A01D 41/1273 |
| 11,553,648 B2 * | 1/2023 | Krehbiel | ............... A01D 45/021 |
| 2016/0073685 A1 | 3/2016 | Cook et al. | |
| 2017/0089742 A1 * | 3/2017 | Bruns | ................ A01D 41/1273 |
| 2018/0054960 A1 | 3/2018 | Gessel et al. | |
| 2018/0249631 A1 * | 9/2018 | Ohms | ..................... A01D 82/00 |
| 2018/0263181 A1 * | 9/2018 | Willgert | ................. G07C 5/006 |
| 2018/0271016 A1 | 9/2018 | Milano et al. | |
| 2018/0368321 A1 | 12/2018 | Noonan et al. | |
| 2019/0021230 A1 * | 1/2019 | Bertino | ................... A01D 57/22 |

(Continued)

FOREIGN PATENT DOCUMENTS

| | | | | |
|---|---|---|---|---|
| CN | 208273607 U | * | 12/2018 | ........... A01D 45/025 |
| DE | 102007049250 B4 | * | 10/2009 | ........... A01D 45/025 |
| DE | 102021114960 A1 | * | 12/2021 | |

*Primary Examiner* — Joseph M Rocca
*Assistant Examiner* — Madeline I Runco
(74) *Attorney, Agent, or Firm* — Buchanan Ingersoll & Rooney PC

(57) ABSTRACT

A corn header for an agricultural vehicle includes two gathering chains which together draw plants into a snapping gap; two snap rolls positioned beneath the two gathering chains; a first brushless DC motor (BLDC) connected to at least one of the two gathering chains for moving the at least one of the two gathering chains; a chopping unit including a movable blade positioned beneath the snap rolls for fragmentizing stalks of the plants drawn into the snapping gap; and a second BLDC connected to the chopping unit for moving the blade and fragmentizing the stalks of the plants.

17 Claims, 4 Drawing Sheets

(56) References Cited

U.S. PATENT DOCUMENTS

2020/0337243 A1* 10/2020 Krehbiel .............. A01D 45/021
2022/0071093 A1* 3/2022 Risius .................. A01D 45/021
2024/0315172 A1* 9/2024 Boetsch ............... A01D 45/023

* cited by examiner

ELECTRIC ROW UNIT DRIVE SYSTEM FOR CORN HEADER OF COMBINE HARVESTER

FIELD OF THE INVENTION

The present invention relates to a corn header for an agricultural harvester. More specifically, the present invention relates to a row unit of a corn header.

BACKGROUND OF THE INVENTION

As is described in U.S. Patent App. Pub. No. 2016/0073585 to CNH America LLC (the '585 Pub.), which is incorporated by reference in its entirety and for all purposes, agricultural harvesters (such as combines, forage harvesters and windrowers) that harvest corn are provided with corn headers including row dividers for directing rows of corn stalks to ear separation chambers or row units comprising stripping plates (or deck plates) defining a stalk receiving slot or gap therebetween. The row units further include snapping rolls (or stalk rolls) located beneath the deck plates and endless gathering chains located above the deck plates. As the combine traverses a field, the row dividers divide the stalks into rows of individual stalks which are pulled downwardly by the rotating stalk rolls. The downward pulling of the stalks by the stalk rolls causes the ears of corn to forcefully strike the deck plates whereupon they are snapped off the stalks. The gathering chains run fore to aft along the row units and transport the stripped corn to an auger for conveying the harvested corn to a feederhouse of the combine. Harvested corn is then processed to the combine's inner chambers for downstream processing. Stalks stripped of corn by the row units are commonly processed by chopping units having cutting blades located beneath the stalk rolls that chop the stalks, leaves, etc. (also known as "material other than grain" or "MOG") into finer pieces which are then distributed onto the field being harvested.

Many conventional systems drive both the row units and chopping units by a complex series of shafts, clutches and gears that derive power from a power takeoff (PTO) connected to the drive train of the combine. It would be advantageous to reduce the complexity of the systems for driving the row units, chopping units and/or the auger.

SUMMARY OF THE INVENTION

According to one aspect of the invention, a corn header for an agricultural vehicle includes two gathering chains which together draw plants into a snapping gap; two snap rolls positioned beneath the two gathering chains; a first brushless DC motor (BLDC) connected to at least one of the two gathering chains for moving the at least one of the two gathering chains; a chopping unit including a movable blade positioned beneath the snap rolls for fragmentizing stalks of the plants drawn into the snapping gap; and a second BLDC connected to the chopping unit for moving the blade and fragmentizing the stalks of the plants.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Figure 1:
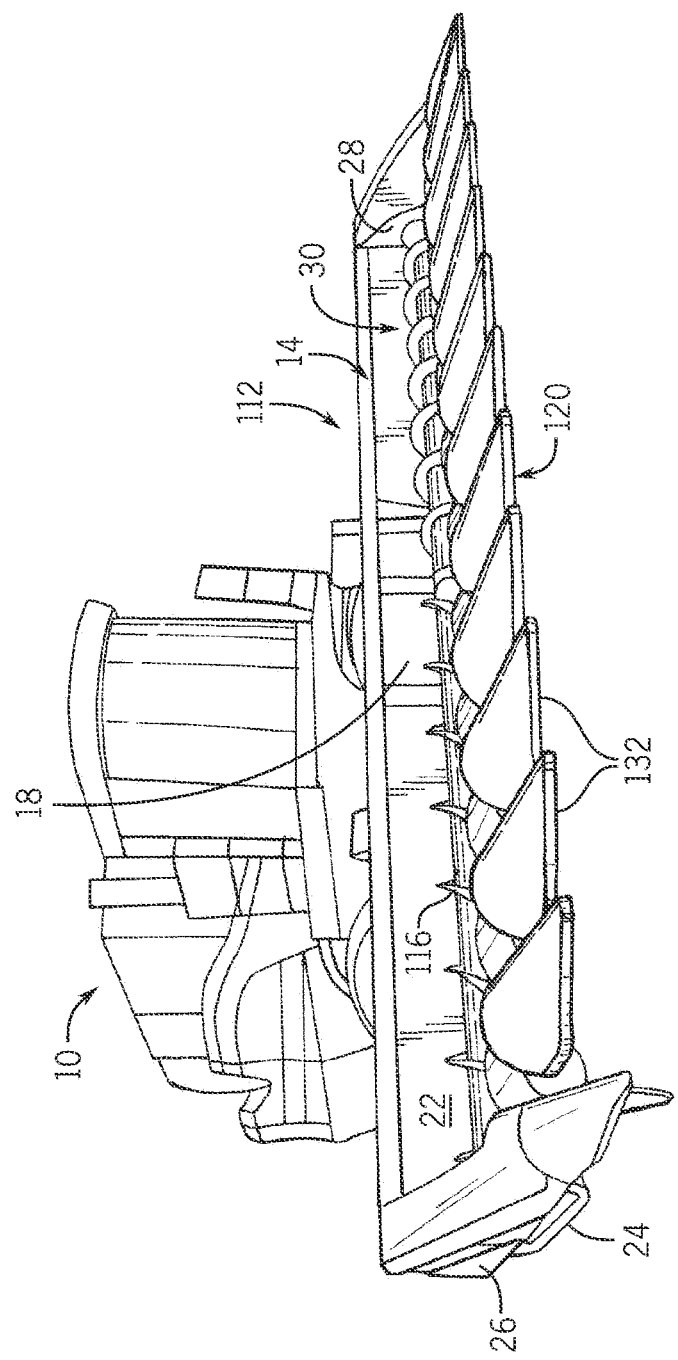
FIG. 1 is a perspective view of an agricultural combine including a corn header.

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing figures.

The terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

FIG. 1 illustrates a typical agricultural vehicle 10 such as a combine harvester to which a corn head assembly (or corn header) 112 is operatively connected. The corn head assembly 112 includes a frame or chassis 14 for mounting to a forward end of the combine harvester 10, a conveyor 116 (such as an auger) extending lengthwise across the chassis 14 for conveying crop material to a combine feeding location or feederhouse 18, and a plurality of row units 120 extending forwardly from the chassis 14.

The conveyor 116 can be a screw auger conveyor 116 (as shown), but can alternatively be any conveyor capable of moving grain, such as a paddle system, a conveyor belt, a pressure based system, or any combination thereof. Such conveyors are known in the art and a further detailed description of their structure, function and operation is not necessary for a complete understanding of the subject application. Conveyor 116 may comprise two different augers (left-hand side and right-hand side) as shown in FIG. 1. Alternatively, conveyor may comprise more than two augers.

The feederhouse 18 transports the harvested crop, e.g., corn, for downstream processing within the combine. Such feederhouses and harvesting structures and operations are known in the art and a further detailed description of their structure, function and operation is not necessary for a complete understanding of the subject application.

The chassis 14 includes a rear wall 22, a bottom wall 24 and a pair of side walls 26, 28. As shown in FIG. 1, the chassis 14 can be connected to a forward end of the vehicle 10. Alternatively, the chassis 14 can be connected to any device that has use for a corn head assembly 112. The chassis 14 further includes a channel 30 formed partially by the bottom wall 24. During operation of header 112, crop material is stripped from the stalks by the cooperative action of row unit stripping plates or deck plates and stripping rolls or stalk rolls. The stripped crop material is then transported to the channel 30 by the continuous movement of endless gathering chains. Upon reaching the channel 30, the conveyor 116 conveys harvested crop to the combine feeding location or feederhouse 18 located proximate a midpoint of the channel 30.

Still referring to FIG. 1, it is illustrated that each of the plurality of row units 120 includes a row divider 132. The row divider 132 extends forwardly from the chassis 14 and extends across a pair of adjacent row units 120. The row divider 132 directs a row of corn stalk towards the aforementioned snapping rolls and stripping plates that are situated between adjacent row dividers.

Figure 2:
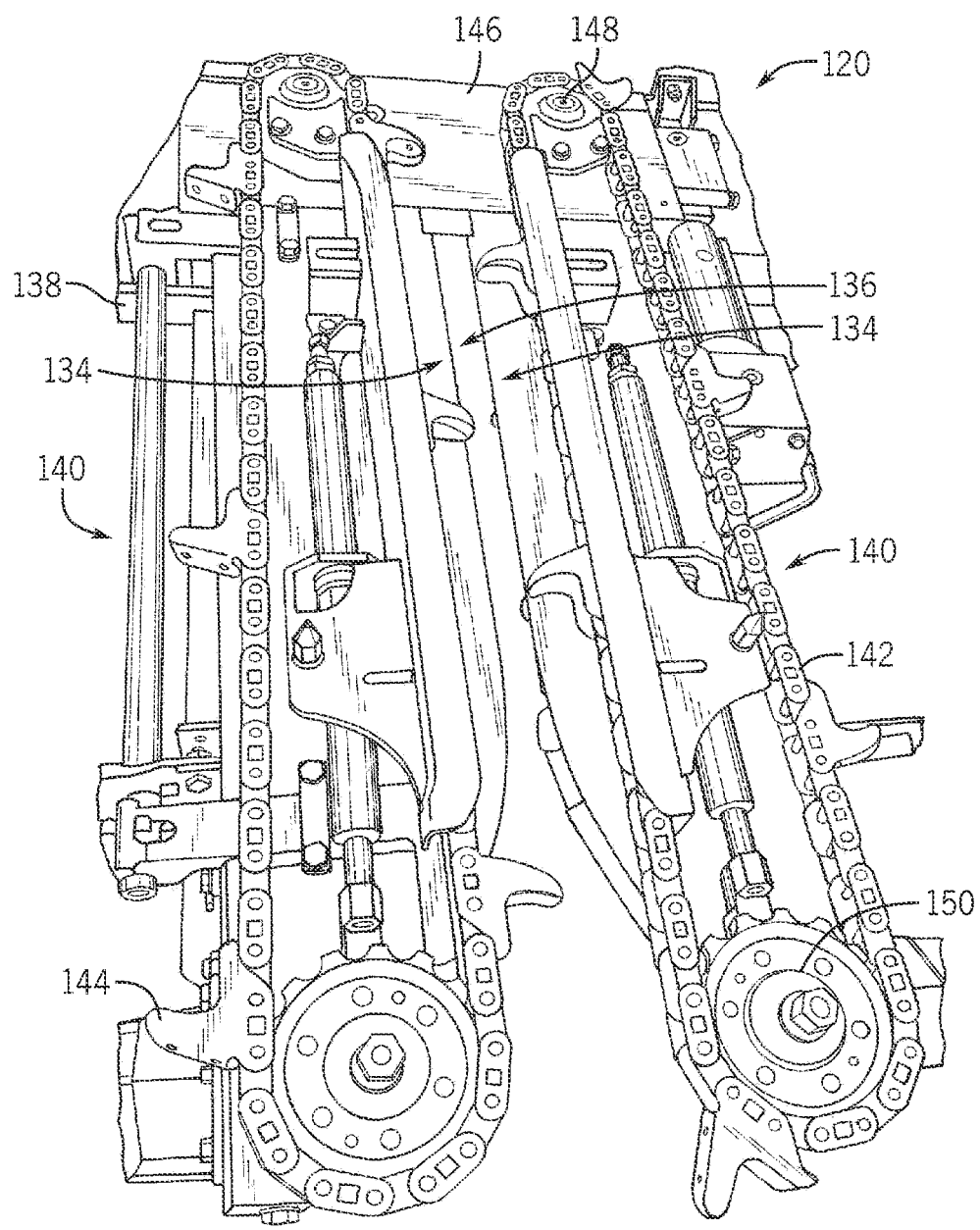
FIG. 2 is a top perspective view of a row unit of the corn header.

FIG. 2 illustrates certain details of row unit 120. In particular, row unit 120 comprises a pair of opposed stripping plates or deck plates 134 which define a crop receiving slot or gap 136 therebetween. Each row unit 120 includes a row unit frame 138 having a pair of row unit arms 140 connected to a chassis or frame of the header. Mounted lengthwise on each row unit arm 140 is an endless gathering chain 142 situated above the deck plates 134 having lugs 144 that direct corn stalks to the rear of the row unit 120 for the removal of corn ears from the stalks by the deck plates 134. In operation, crop material is stripped from the stalk and then travels across a breast plate 146 to a channel similar to channel 30 of FIG. 1. The crop material stripped from the stalk is propelled rearwardly to the channel due to the continuous flow of harvested crop material flowing rearwardly as a result of the actions of the gathering chains 142.

Figure 3:
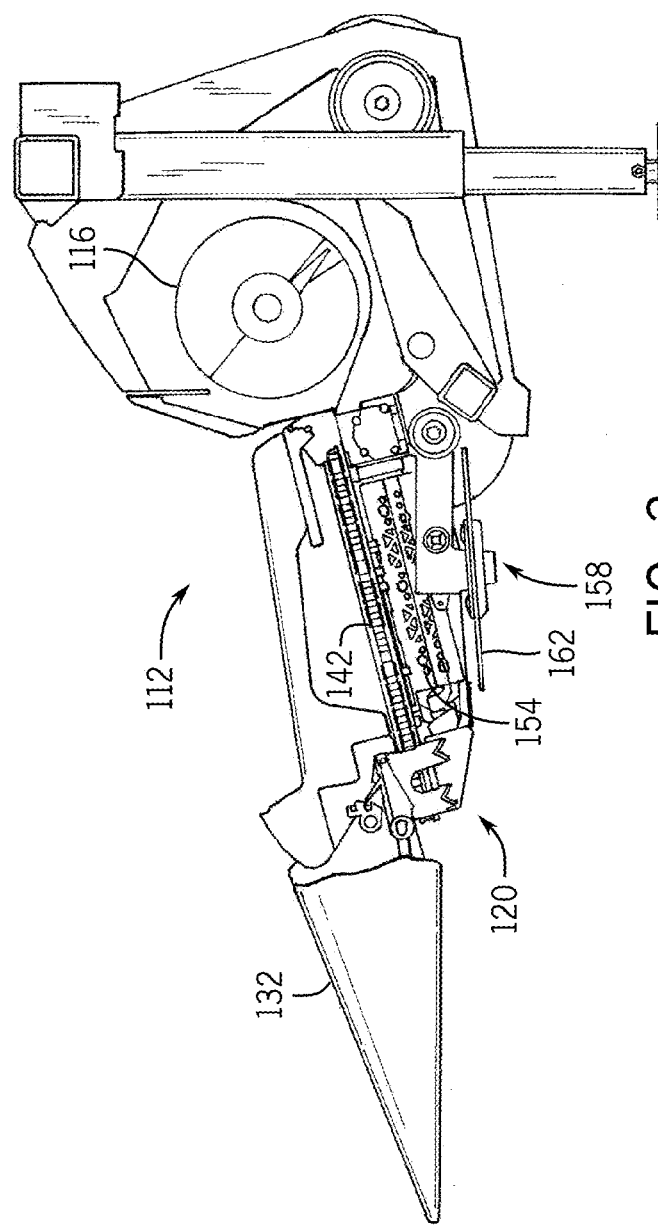
FIG. 3 is a side elevation view of the corn header with certain elements omitted for clarity of illustration.

Each gathering chain 142 is entrained about a drive sprocket 148 disposed at a proximal end of a respective row unit arm 140 and a driven sprocket 150 located at a distal end of a respective row unit arm. The gathering chain 142, drive sprocket 148 and driven sprocket 150 are situated above the deck plates 134. Rotation of the drive sprocket 148 causes corresponding rotation of the driven sprocket 150. Header 112 also includes a plurality of chopping units 158 (only one of which is illustrated) each having a rotatable chopping blade 162 located beneath the stalk rolls 154 (FIG. 3).

During harvesting operations, the row dividers 132 direct a row of corn stalk toward the deck plates 134 described above in connection with FIG. 2. As the stalk reaches the deck plates by passing through the stalk receiving gap 136 it is engaged by a pair of opposed rotating snapping rolls or stalk rolls 154 situated beneath the deck plates. The stalk rolls 154 engage the corn stalk and pull the stalk downwardly whereby the corn ears strike the deck plates and are stripped from the stalk. Chopping units 158 are configured for cutting and processing stalks stripped of corn (by the row units) into finer pieces which are then distributed onto the field being harvested.

Further details of the chopping units, stalk rolls, and gathering chains are described in the '585 Pub., U.S. Patent App. Pub. No. 2018/0054960, and U.S. Pat. Nos. 8,534,036 and 10130038, each of which is incorporated by reference herein in its entirety and for all purposes.

Those patent references describe complex drive systems including interconnected shafts, gears, gear boxes, chains, clutches, etc., for powering the augers, chopping units, stalk rolls, and/or gathering chains. Also, depending upon the configuration of the header, the gear ratios between the augers, chopping units, stalk rolls, and/or gathering chains of the patent references may be fixed and permanently set by virtue of the various geared connections between those components.

In contrast, the augers, chopping units, stalk rolls, and gathering chains (i.e., drive components) of the instant invention are powered by separate electric motors. As compared with the systems of the above patent references, the electric motors eliminate a significant proportion of the weight, noise, and complexity (e.g., design, manufacturing, service, and parts inventory) associated with those drive components.

Figure 4:
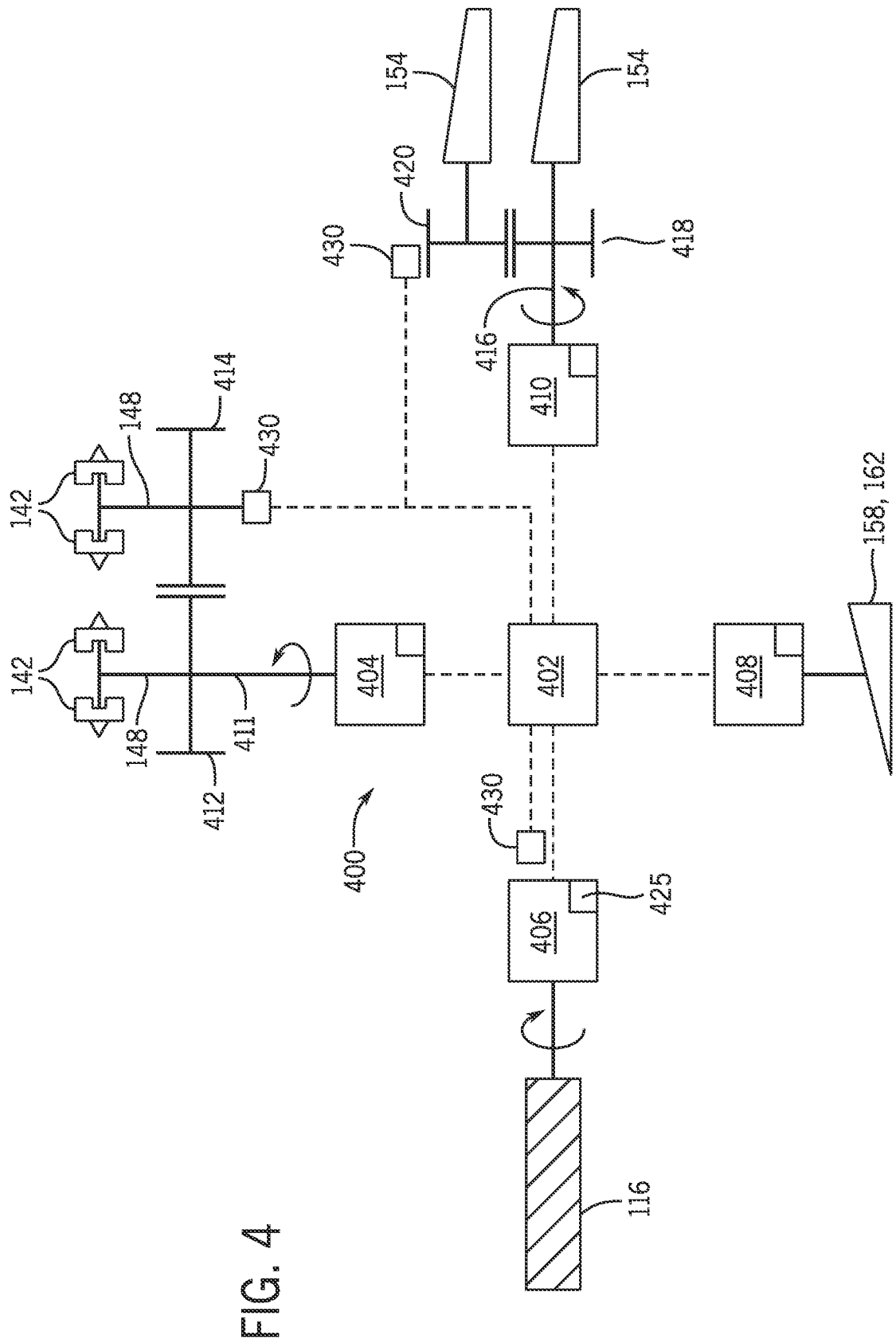
FIG. 4 is a schematic depicting a system for operating various motors of the corn header.

FIG. 4 depicts a system 400 for powering the drive components (i.e., augers, chopping units, stalk rolls, and gathering chains) of corn header 112. It should be understood that system 400 is not limited for use with a corn header, and may be incorporated into any different type of header for driving the components of those headers.

System 400 includes a controller/processor 402 that is electrically connected to various motors 404, 406, 408, and 410 via signal and power lines. Electrical lines/connections are depicted in broken lines in FIG. 4. Controller/processor 402 is (optionally) connected to the computer processor of the agricultural vehicle such that an operator can transmit and receive signals from processor 402 from the cab of the agricultural vehicle (for example). Specifically, the operator can control and monitor the operation of those motors via a display of the computer processor of the agricultural vehicle. Signals transmitted to each motor may relate to output speed, current limits, etc.

Turning to the motors of system 400, motor 404 is configured to rotate gathering chains 142. Specifically, motor 404 has a rotatable output shaft 411 that is non-rotatably connected to a gear 412. Gear 412 is connected to and rotates one of the sprockets 148, which rotates one of the gathering chains 142 that is wound about that sprocket 148. Gear 412 is also connected to (i.e., meshed with) another gear 414. Gear 414 is connected to and rotates another sprocket 148, which rotates another one of the gathering chains 142. Chains 142 simultaneously rotate at the same speed and in opposite rotational directions by virtue of their geared connection. It should be understood that the arrangement of the gears 412 and 414 is not limited to that which is shown, and can vary from that which is shown and described.

Motor 406 has a rotatable output shaft that is non-rotatably connected to one of the augers 116 for rotating that auger 116. Motor 408 has a rotatable output shaft that is non-rotatably connected to one of the chopping units 158 for rotating the blade 162 of that chopping unit 158 about its axis. Although not shown, motor 408 may be (indirectly) connected to another chopping unit 158 via gears, shafts, etc.

Motor 410 has a rotatable output shaft 416 that is non-rotatably connected to a gear 418. Gear 418 is non-rotatably connected to one of the stalk rolls 154 such that the gear 418 rotates that stalk roll 154. Gear 418 is also connected to (i.e., meshed with) another gear 420. Gear 420 is connected to and rotates another one of the stalk rolls 154. The two stalk rolls 154 simultaneously rotate at the same speed and in opposite directions by virtue of their geared connection. It should be understood that the arrangement of the gears 418 and 420 is not limited to that which is shown, and can vary.

Although not shown, in lieu of motor 410, gear 418 of one stalk roll 154 could be connected to gear 412 via a bevel gear arrangement, and gear 420 of the other stalk roll 154 could be connected to gear 414 via a similar bevel gear arrangement, such that motor 410 could simultaneously power the two gathering chains 142 and the two stalk rolls 154. Again, as noted above, the gearing arrangement is not limited to any particular arrangement.

Each motor 404, 406, 408 and 408 (motor, hereinafter) includes a motor controller 425. Motor controller 425 may or may not be integral with its motor. Each motor controller 425 receives power and signals from controller 402, and transmits signals back to controller 402. Each motor is a brushless DC motor (BLDC motor). The motor controller 425 drives its BLDC motor at the speed designated by the controller 402, as well as monitors and relays the speed of the motor and current consumption back to the controller 402. The motor controller 425 acts as the current limiter in the event of high current draw. The use of BLDC motors eliminates the maintenance requirements and noise normally associated with conventional DC motors. It also allows a high torque at high speed, whereas conventional brushed DC motors can lose torque as speed increases.

Because each motor can be separately controlled, the speeds of the driven components (i.e., augers, chopping units, stalk rolls, and gathering chains) can be separately controlled. Also, the different row units can be operated at different speeds. This feature is particularly beneficial during a turning maneuver of the vehicle, where each row unit experiences a different ground speed. Using separate motors, the processing speed of each row unit can be tailored to match the local ground speed at that row unit.

Additionally, each row unit is equipped with one or more vibration sensors 430 (accelerometer, for example) which would sense the vibrations of that row unit and drive system. If the vibration exceeded certain magnitude/frequency thresholds, that would be relayed to the user via controller 402.

System 400 offers a number of advantages, some of which were described above (e.g., weight reduction). The following are some additional advantages of using system 400.

First, for combines having adjustable header speed drives, the header speed to ground speed would become the gathering chain speed to ground speed. All other speeds on the header would be adjusted relative to the gathering chains. This enables the operator to infinitely and precisely change the ratio of the stalk rolls to the gathering chains. The operator would set the ratio through the combine interface (if the vehicle was so equipped), or through the controller 402. This also enables the operator to change the ratio of the chopper to gathering chain speed. The chopper on each row unit can be engaged and disengaged without the operator getting under the header (or even leaving the cab if the combine were equipped to communicate with the controller 402). The operator would be able to infinitely adjust the ratio of each auger section to the gathering chains. In the event of a row unit plugging, the operator would be able to be informed not only of a plug, but exactly which row unit plugged via controllers 425 and 402. In the event of a broken chopper blade 162, a bearing malfunctioning on the row unit, or other vibration inducing failure, the operator would be informed immediately of exactly which row unit has a problem via controllers 425 and 402.

Another advantage of using system 400 is reduced owner and warranty costs. With the elimination of the slip clutches, there would be no need to maintain, service, or replace worn clutches.

Another advantage for combines having an interface to the header is that the speed of each row unit on the header can be changed on the fly to accommodate the change in the speed of the header over the ground during a turn, exactly synchronizing the gathering chain (and thus stalk rolls and chopper) of each row with the crop coming into the row unit.

Another advantage of using system 400 is ease of manufacture. As one example, manufacturing may more easily perform a run-in test before installing the row units on the header to ensure correct row-unit assembly. With only electrical connectors to be connected, the need to move shafts and have dedicated motors and controllers would be eliminated. Also, to install or remove a row unit, fewer wires and hardware would be required. No shafts would have to be handled, or row units rotated to align a shaft and a coupler, greatly reducing labor times in both manufacturing and service.

System 400 also offers an advantage from a logistics perspective. With three motor/controllers per row unit and one motor/controller for each auger section, for example, there would no longer be a need for various length shafts for different size heads, gearboxes, chains, or clutches. This reduction in parts count reduces the need for warehousing space and inventory control.

Lastly, since the power to run the header is now based on an electrical system, the header/feeder drive does not have to handle that load. Accordingly, more power can be provided to the other systems of the vehicle (e.g., feeder, rotor, etc.).

It is to be understood that the process of operating system 400 can be performed by the controllers 402/425 upon loading and executing software code or instructions which are tangibly stored on the respective tangible computer readable mediums. Memory may be in the form of a magnetic medium, e.g., a computer hard drive, an optical medium, e.g., an optical disc, solid-state memory, e.g., flash memory, or other storage media known in the art. Thus, any of the functionality performed by the controllers 402/425 described herein is implemented in software code or instructions which are tangibly stored on a tangible computer readable medium. Upon loading and executing such software code or instructions by the controllers 402/425, the controllers 402/425 may perform any of the functionality of the controllers 402/425 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A corn header for an agricultural vehicle, said corn header comprising one or more row units, each row unit comprising:
two gathering chains which together draw plants into a snapping gap;
two snap rolls positioned beneath the two gathering chains;
a first brushless DC motor (BLDC) connected to at least one of the two gathering chains for moving the at least one of the two gathering chains;
a chopping unit including a movable blade positioned beneath the snap rolls for fragmentizing stalks of the plants drawn into the snapping gap;
a second BLDC connected to the chopping unit for moving the blade and fragmentizing the stalks of the plants; and
a controller/processor connected to the first and second BLDCs for separately controlling the first and second BLDCs, wherein the controller/processor is configured to be connected to a computer processor of the vehicle,
wherein the controller/processor is configured to set a gathering chain speed based upon a ground speed of the vehicle, the controller/processor is further configured to set a snap roll speed as a function of the gathering chain speed, and the controller/processor is further configured to set a chopping unit speed as a function of the gathering chain speed.

2. The corn header of claim 1 further comprising another BLDC connected to at least one of the two snap rolls for rotating the at least one of the two snap rolls.

3. The corn header of claim 1, wherein the first BLDC is also connected to at least one of the two snap rolls for rotating the at least one of the two snap rolls.

4. The corn header of claim 3, wherein the first BLDC is also connected to the other gathering chain for moving the other gathering chain.

5. The corn header of claim 1, further comprising an auger attached to the header and positioned downstream of the gathering chains, and another BLDC connected to the auger for rotating the auger.

6. The corn header of claim 1, wherein the first BLDC is also connected to the other gathering chain for moving the other gathering chain.

7. The corn header of claim 1, wherein each BLDC motor includes a motor controller that receives power and signals from the controller/processor, and transmits signals back to the controller/processor.

8. The corn header of claim 7, wherein, for each BLDC, the motor controller is integrated with the BLDC.

9. The corn header of claim 1, further comprising a vibration sensor associated with the gathering chains or the first BLDC for monitoring vibrations produced by the gathering chains and communicating signals indicative of the vibrations to the controller/processor.

10. The corn header of claim 1, wherein speeds of the at least one of the two gathering chains and the chopping unit are independently settable by the controller/processor.

11. The corn header of claim 1, further comprising a geared arrangement interconnecting the gathering chains to the first BLDC.

12. The corn header of claim 1, further comprising another BLDC connected to the two snap rolls by a geared arrangement.

13. The corn header of claim 1, wherein the chopping unit is not connected to or controlled by a clutch, the gathering chains are not connected to or controlled by a clutch, and the two snap rolls are not connected to or controlled by a clutch.

14. The corn header of claim 1, further comprising a frame to which the gathering chains, snap rolls, chopping unit and BLDCs are either directly or indirectly mounted.

15. An agricultural vehicle comprising the corn header of claim 1.

16. The corn header of claim 7, wherein each motor controller acts as a current limiter in an event of current draw above a pre-determined limit.

17. The corn header of claim 1, wherein the one or more row units comprise a plurality of row units, wherein during a turning maneuver of the vehicle each row unit of the plurality of row units experiences a different ground speed, and wherein the controller/processor of each row unit is configured to adjust the speeds of the first and second BLDCs to match a ground speed experienced at that row unit.

* * * * *